Dec. 27, 1966 M. KOENIGSBERG ETAL 3,294,115
SWING TYPE CHECK VALVE
Filed July 22, 1963
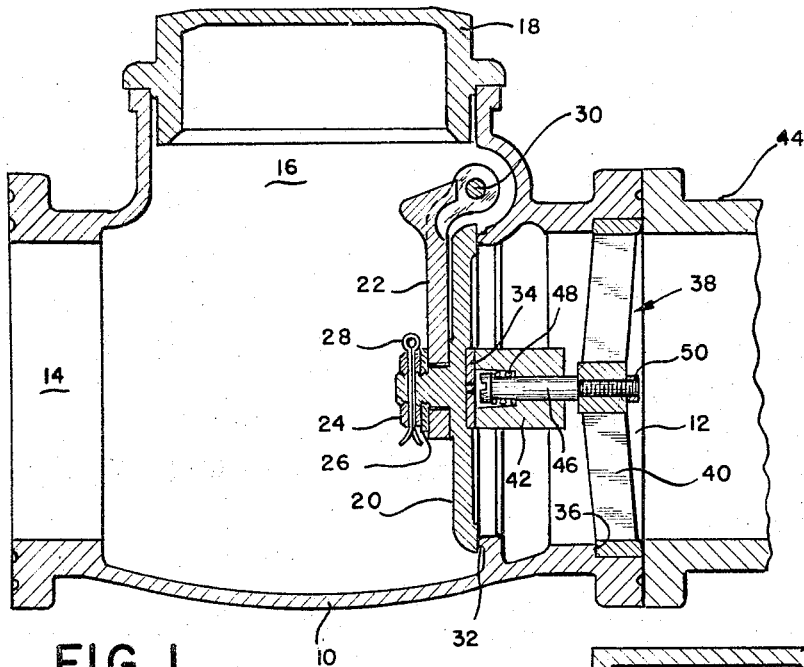
FIG.1
FIG.2
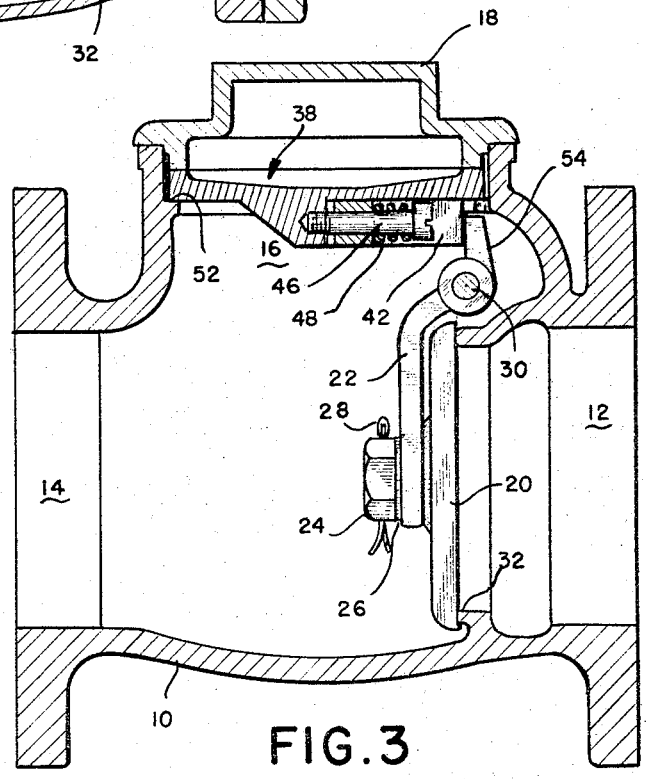
FIG.3
INVENTORS
MAX KOENIGSBERG
RICHARD J. HEIL
BY *Bayard H. Michael*
ATTORNEY … … Patented Dec. 27, 1966

3,294,115
SWING TYPE CHECK VALVE
Max Koenigsberg, Highland Park, Ill., and Richard J. Heil, Hales Corners, Wis., assignors to Milwaukee Valve Company, Inc., Milwaukee, Wis., a corporation of Wisconsin
Filed July 22, 1963, Ser. No. 296,840
3 Claims. (Cl. 137—527)

This invention pertains to an improved swing type check valve and particularly to means for adapting the check valve for applications in which the valve is subjected to severe vibrations and shock.

A specific application of the swing type check valve embodying the present invention is in liquid or dry bulk transportation vehicles in which the valve forms part of the load discharge system. In applications as this the road shock tends to pound the valve disc against its seat when the vehicle is hauled "light-loaded" or empty and thereby accelerates the wear of the valve parts.

The principal object of this invention is to provide means for prolonging the life of a swing type check valve when it is used in transportation equipment or in similar applications in which the valve is subjected to severe vibrations and shock.

This object is attained by providing a magnetic coupling in the valve housing to hold the valve disc against its seat and thus eliminating the pounding experienced heretofore. When flow is started through the valve, a minimal force will break the magnetic force of the coupling, whereafter the flow will swing the valve disc to its fully open position and out of the magnetic field of the coupling. Thus, during operation of the check valve, the magnetic coupling will have no effect upon the valve disc, and the valve will function as an ordinary swing type check valve. Further, the check valve embodying the present invention is designed to removably retain the magnetic coupling within the valve housing and to permit its easy and quick removal for replacement or repair. This feature also makes it possible for the valve manufacturer to sell one standard swing type check valve and to provide the magnetic coupling either as a separate item for customers who have previously purchased the valve, or to incorporate the coupling in the standard valves when they are sold for applications in which the vibrations and shock conditions might be experienced.

Other objects and advantages will be pointed out in or be apparent from the specification and claims, as will obvious modifications of the two embodiments shown in the drawings, in which:

FIG. 1 is a cross sectional view of the swing type check valve embodying the present invention;

FIG. 2 is a plan view of the retainer cage when it is removed from the valve housing; and FIG. 3 is a cross sectional view of a swing type check valve showing a second embodiment of the present invention.

Referring to the drawings, FIG. 1 shows a valve housing 10 having inlet and outlet openings 12 and 14 and having a central opening 16 which is normally closed by cap 18. A valve disc 20 is mounted on lever 22 by means of disc nut 24, washer 26, and cotter-pin 28, and the lever is pivotally secured to pin 30 to permit the disc to normally lie against valve seat 32. The parts so far described are those of the well known swing type check valve in which flow through the inlet 12 will cause the disc 20 to pivot away from the valve seat and permit flow through the valve housing, and in which flow in the other direction will be prevented because it will force the disc against its seat. Also, the parts so far described are generally made of cast bronze or of another generally corrosion resistant material.

In a swing type check valve of this type the disc 20 is normally retained in the valve closing position by the force of gravity. This is quite satisfactory in the majority of applications, however, if the valve is subjected to vibrations, the disc bounces against the valve seat thereby causing accelerated wear of the valve parts. To guard against this condition, we provide the heretofore described "standard" swing type check valve with small plate 34 of magnetizable material which is brazed or otherwise secured to the inside face of the bronze disc 20. Further, we provide an annular internal shoulder 36 at the inlet of the valve housing. As it will be apparent from the further description of this invention, these two relatively minor and inexpensive modifications of the "standard" check valve will render the valve usable for normal or stationary applications, as well as for applications in which the detrimental vibrations are encountered. In the former cases the valve is used with the parts as described above. When used in the latter case, a retainer cage 38 is inserted in the inlet opening 12 and positioned against shoulder 36. The retainer cage has a centrally extending rib 40 which serves to hold a permanent magnet 42 opposite plate 34 of the valve disc 20 when the latter is in the normal valve closing position. Although the retainer cage is slidably mounted within the inlet opening, its position is fixed when the valve housing 10 is secured to a conduit 44, in which case the latter engages the free side of the retainer cage as shown in FIG. 1. When the valve is equipped with the retainer cage and its associated permanent magnet, the valve disc 20 will be normally retained in the valve closing position despite vibrations and/or shock; however, the magnetic force between the magnet 42 and the plate 34 will be such that the flow through the valve will be ample to overcome this force. After the initial opening of the valve, the flow will swing the disc to an open position at which time the plate 34 will be removed from the field of magnet 42 and thus the operation of the valve will be unaffected by the magnet.

In order to compensate for manufacturing tolerances and to assure that the magnet does not pull the disc 20 to the valve closing position at times of low flow through the valve housing, the magnet 42 is slidably mounted on stud 46 and biased by compression spring 48 in a direction away from the disc 20. The stud is threadably received in a suitable aperture of the rib 40 and is secured thereto by a retaining nut 50. Thus, when the disc swings downwardly and against the valve seat 32, the magnetic force causes the magnet to move in contact with the plate 34, thereby compressing spring 48 and moving a short distance away from rib 40. As the disc is swung open in response to flow through the valve, the spring 48 moves the magnet a short distance away from the normal valve closing position. As it should be apparent, this feature both assures contact between the magnet 42 and plate 34 despite variances in manufacturing tolerances and also reduces the magnetic forces exerted on the disc as the latter is initially or only partially opened.

The modification shown in FIG. 3 shows a substantially identical valve as that described above, and corresponding parts thereof have been indicated with corresponding reference numerals. The only significant difference is that the retainer cage 38 is mounted in the central opening 16 and is fixed therein by shoulder 52 and cap 18. Also the plate 34 is eliminated and instead the lever 22 is provided with an upstanding tab 54 of magnetizable material which cooperates with the magnet 42 to provide the same advantages to the check valve as those described in connection with the first embodiment of this invention.

Although but two embodiments of the present invention have been illustrated and described, it will be apparent to those skilled in the art that various changes and

We claim:

1. A swing type check valve comprising; a valve housing having a valve seat; a disc pivotally mounted in said housing and adapted to normally engage said seat to close the check valve, and said disc being responsive to flow through said housing in one direction to move away from said seat; a retainer cage removably mounted in said housing; a magnetizable member connected for motion with said disc, and a magnet mounted on said retainer cage, said magnetizable member and magnet cooperating when said disc is in the valve closing position to bias said disc against said seat and prevent its movement in response to vibrations of the valve, and said magnetizable member moving out of the effective magnetic field of said magnet when the former is moved as said disc moves away from said valve seat; and a spring, said magnet being slidably secured to said retainer cage and being moved in a direction away from said disc by said spring when said disc moves away from said seat.

2. A swing type check valve adapted for use in installations in which the valve is subjected to vibrations, comprising; a valve housing having a valve seat and inlet and outlet openings; a disc member of non-magnetic and generally corrosion resistant material pivotally mounted in said housing and adapted to normally engage said valve seat to close the valve and being responsive to flow through said housing in one direction to move away from said seat; a retainer member removably mounted in said housing; a magnetizable piece secured to one of said members, and a magnet secured to the other of said members, said magnetizable piece and magnet being in contact and biasing said disc against said seat when said disc member is engaged with said seat to thereby prevent the movement of said disc member in response to the vibrations of the valve, said magnetizable piece and said magnet moving apart as said disc member moves away from said valve seat thereby becoming ineffective to urge said disc in a closing direction; and spring means operable to urge said magnetizable piece and said magnet apart relative to each other, said magnet having sufficient magnetic force to overcome the force of said spring means when said disc member closes the valve thereby permitting said contact between said magnetizable piece and said magnet.

3. A swing type check valve comprising, a valve housing member having a valve seat; a disc member pivotably mounted in said housing and adapted to normally engage said seat to close the check valve, said disc member being responsive to flow through said housing in one direction to move away from said seat; a magnetizable component connected to one of said members and a magnet component connected to the other of said members; said components having such relative position in respect to each other, that said components exert a magnetic closing bias upon said disc member when said disc member engages said seat, and that said magnetizable component moves (relative to said magnet component) out of the effective magnetic force of said magnet component when said disc member moves away from said valve seat; and spring means interposed between one of said components and the member to which it is connected to thereby permit limited relative motion between said components independently of the relative motion between said housing and disc members.

References Cited by the Examiner
UNITED STATES PATENTS

| | | | |
|---|---|---|---|
| 1,982,189 | 11/1934 | Anderson | 137—527.2 |
| 2,646,071 | 7/1953 | Wagner | 251—65 X |
| 2,938,540 | 5/1960 | Schatzman et al. | 251—65 X |

M. CARY NELSON, *Primary Examiner.*

MARTIN P. SCHWADRON, *Examiner.*